United States Patent
Kim

(10) Patent No.: US 11,459,934 B1
(45) Date of Patent: Oct. 4, 2022

(54) APPARATUS AND METHOD FOR CONTROLLING ACTIVE AIR FLAP

(71) Applicants: HYUNDAI MOTOR COMPANY, Seoul (KR); KIA CORPORATION, Seoul (KR)

(72) Inventor: Young Kwon Kim, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/459,651

(22) Filed: Aug. 27, 2021

(30) Foreign Application Priority Data

Apr. 9, 2021 (KR) .................. 10-2021-0046213

(51) Int. Cl.
*F01P 7/10* (2006.01)
*B60K 11/08* (2006.01)
*F01P 11/10* (2006.01)

(52) U.S. Cl.
CPC .............. *F01P 7/10* (2013.01); *B60K 11/085* (2013.01); *F01P 11/10* (2013.01); *F01P 2025/04* (2013.01); *F01P 2025/36* (2013.01); *F01P 2025/42* (2013.01); *F01P 2025/66* (2013.01); *F01P 2037/00* (2013.01)

(58) Field of Classification Search
CPC ....... B60K 11/085; B60K 11/04; B60K 11/08; B62D 37/02; B62D 35/005
See application file for complete search history.

(56) References Cited

U.S. PATENT DOCUMENTS

| | | | |
|---|---|---|---|
| 9,669,885 B1* | 6/2017 | Fahland | B62D 37/02 |
| 2016/0361990 A1* | 12/2016 | Porras | B60L 1/02 |
| 2017/0036709 A1* | 2/2017 | Metka | B62D 35/001 |
| 2017/0080770 A1* | 3/2017 | Irwin | B62D 35/00 |
| 2020/0385070 A1* | 12/2020 | Cattell | B62D 35/02 |

FOREIGN PATENT DOCUMENTS

| | | |
|---|---|---|
| JP | 2020-011683 A | 1/2020 |
| KR | 10-1765958 B1 | 8/2017 |

* cited by examiner

*Primary Examiner* — Long T Tran
(74) *Attorney, Agent, or Firm* — McDonnell Boehnen Hulbert & Berghoff LLP

(57) ABSTRACT

An apparatus for controlling an active air flap (AAF) of a vehicle may include a plurality of sensors configured to detect status information of the vehicle; an opening degree controller configured to control an opening degree of the AAF; and a processor configured to determine a target flow and a target opening degree of the AAF based on the status information, calculate an initial speed of a wake generated by a preceding vehicle based on vehicle information of the preceding vehicle, obtain a speed of the wake when the wake arrives the vehicle based on a speed of the vehicle, an inter-vehicle distance between the vehicle and the preceding vehicle, and the initial speed of the wake, correct the target opening degree based on the speed of the wake, and adjust the opening degree of the AAF corresponding to the corrected target opening degree.

16 Claims, 5 Drawing Sheets

APPARATUS AND METHOD FOR CONTROLLING ACTIVE AIR FLAP

CROSS-REFERENCE TO RELATED APPLICATION

This application claims priority to and the benefit of Korean Patent Application No. 10-2021-0046213 filed on Apr. 9, 2021, the entire contents of which are incorporated herein by reference

TECHNICAL FIELD

The present disclosure relates to an apparatus and method for controlling an active air flap (AAF), and more particularly, to an apparatus and method for controlling an opening degree of an AAF in a vehicle.

BACKGROUND

An active air flap (AAF) is installed at a position where an external air flows into a vehicle (e.g., on a grill side of a radiator) so that an opening degree (an opening amount) is actively controlled, and a flow of air, that is, a cooling air volume, flowing into an engine room side of the vehicle is controlled according to the opening degree of the AAF.

Currently, the AAF is controlled with reference to a vehicle speed, an engine load, a cooling temperature, a refrigerant pressure of an air conditioning system, a temperature, etc. Here, the reference to the vehicle speed for the AAF control is made on the assumption that a relative speed between the vehicle and the external air is equal to the vehicle speed in a state where there is no obstacle in front of the vehicle.

Meanwhile, if there is a preceding vehicle traveling close to the vehicle, the relative speed between the vehicle and the external air is reduced due to a wake generated by the preceding vehicle, and in this case, the cooling air volume may be also reduced for the same opening degree of the AAF. However, in the conventional AAF control, as described above, because the effect of the wake generated by the preceding vehicle is not considered, when there is a preceding vehicle traveling close to the vehicle, the opening degree of the AAF is not sufficient and thus, the cooling air volume is reduced, which may cause an increase in energy required to cool a power train (PT)/power electronics (PE).

The above information disclosed in this Background section is only for enhancement of understanding of the background, and therefore it may contain information that does not form the prior art that is already known in this country to a person of ordinary skill in the art.

SUMMARY

The present disclosure provides an apparatus and method for controlling an active air flap (AAF) having advantages of appropriately adjusting an opening degree of the AAF in consideration of the influence of a wake generated by a preceding vehicle.

An exemplary form of the present disclosure provides an apparatus for controlling an active air flap (AAF) of a vehicle including a plurality of sensors configured to detect status information of the vehicle; an opening degree control apparatus configured to control an opening degree of an AAF; and a processing device configured to determine a target flow and a target opening degree of the AAF based on the status information, calculate an initial speed of a wake generated by a preceding vehicle of the vehicle based on vehicle information of the preceding vehicle, obtain a speed of the wake at a time when the wake arrives the vehicle based on a speed of the vehicle, an inter-vehicle distance between the vehicle and the preceding vehicle, and the initial speed of the wake, correct the target opening degree based on the speed of the wake at the time when the wake arrives the vehicle, and control the opening degree control apparatus to adjust the opening degree of the AAF in correspondence to the corrected target opening degree.

The processing device may calculate the initial speed of the wake based on a vehicle speed, an overall height, and an air resistance coefficient of the preceding vehicle.

The apparatus may further include a communication device, and the processing device may receive the vehicle speed, the overall height, and the air resistance coefficient of the preceding vehicle through the communication device.

The processing device may identify a vehicle model of the preceding vehicle from an image of the preceding vehicle captured through a camera, and use an air resistance coefficient and an overall height of an industry average level corresponding to the vehicle model of the preceding vehicle as the air resistance coefficient and the overall height of the preceding vehicle.

The plurality of sensors may include a distance sensor, and the processing device may obtain the vehicle speed of the preceding vehicle based on an inter-vehicle distance between the vehicle and the preceding vehicle measured through the distance sensor and a vehicle speed of the vehicle.

The processing device may correct the target opening degree to increase in order to compensate for a reduction in the flow of the AAF due to the speed of the wake at the time when the wake arrives the vehicle.

The processing device may correct the target opening degree to increase as the speed of the wake at the time when the wake arrives the vehicle increases.

The status information may include a cooling water temperature, a coolant/refrigerant pressure, and an intake air temperature of air flowing into an engine combustion chamber of the vehicle, and the processing device may determine the target flow and the target opening degree based on the cooling water temperature, the coolant/refrigerant pressure, and the intake air temperature.

Another form of the present disclosure provides a method of controlling an active air flap (AAF) of a vehicle including detecting status information of the vehicle; determining a target flow and a target opening degree of the AAF based on the status information; when a preceding vehicle is detected, calculating an initial speed of a wake generated by the preceding vehicle based on vehicle information of the preceding vehicle; obtaining a speed of the wake at a time when the wake arrives the vehicle based on a speed of the vehicle, an inter-vehicle distance between the vehicle and the preceding vehicle, and the initial speed of the wake; correcting the target opening degree based on the speed of the wake at the time when the wake arrives the vehicle; and adjusting the opening degree of the AAF in correspondence to the corrected target opening degree.

The calculating of the initial speed of the wake may include calculating the initial speed of the wake based on a vehicle speed, an overall height, and an air resistance coefficient of the preceding vehicle.

The method may further include receiving the vehicle speed, the overall height, and the air resistance coefficient of the preceding vehicle from the preceding vehicle.

The method may further include identifying a vehicle model of the preceding vehicle from an image of the preceding vehicle captured through a camera, and obtaining an air resistance coefficient and an overall height of an industry average level corresponding to the vehicle model of the preceding vehicle as the air resistance coefficient and the overall height of the preceding vehicle.

The method may further include obtaining the vehicle speed of the preceding vehicle based on an inter-vehicle distance between the vehicle and the preceding vehicle and a vehicle speed of the vehicle.

The correcting may include correcting the target opening degree to increase in order to compensate for a reduction in the flow of the AAF due to the speed of the wake at the time when the wake arrives the vehicle.

The correcting the target opening degree to increase may include correcting the target opening degree to increase as the speed of the wake at the time when the wake arrives the vehicle increases.

The status information may include a cooling water temperature, a coolant/refrigerant pressure, and an intake air temperature of air flowing into an engine combustion chamber of the vehicle, and wherein the determining of the target flow and the target opening degree may include determining the target flow and the target opening degree based on the cooling water temperature, the coolant/refrigerant pressure, and the intake air temperature.

In some forms of the present disclosure, the fuel efficiency of the vehicle may be improved by appropriately adjusting the opening degree of the AAF in consideration of the influence of the wake generated by the preceding vehicle.

DRAWINGS

FIG. 1 schematically shows an apparatus for controlling an active air flap (AAF) of a vehicle in some forms of the present disclosure.

FIG. 2 briefly shows a V2 profile used in an apparatus for controlling an AAF of a vehicle in some forms of the present disclosure.

Figure 5:
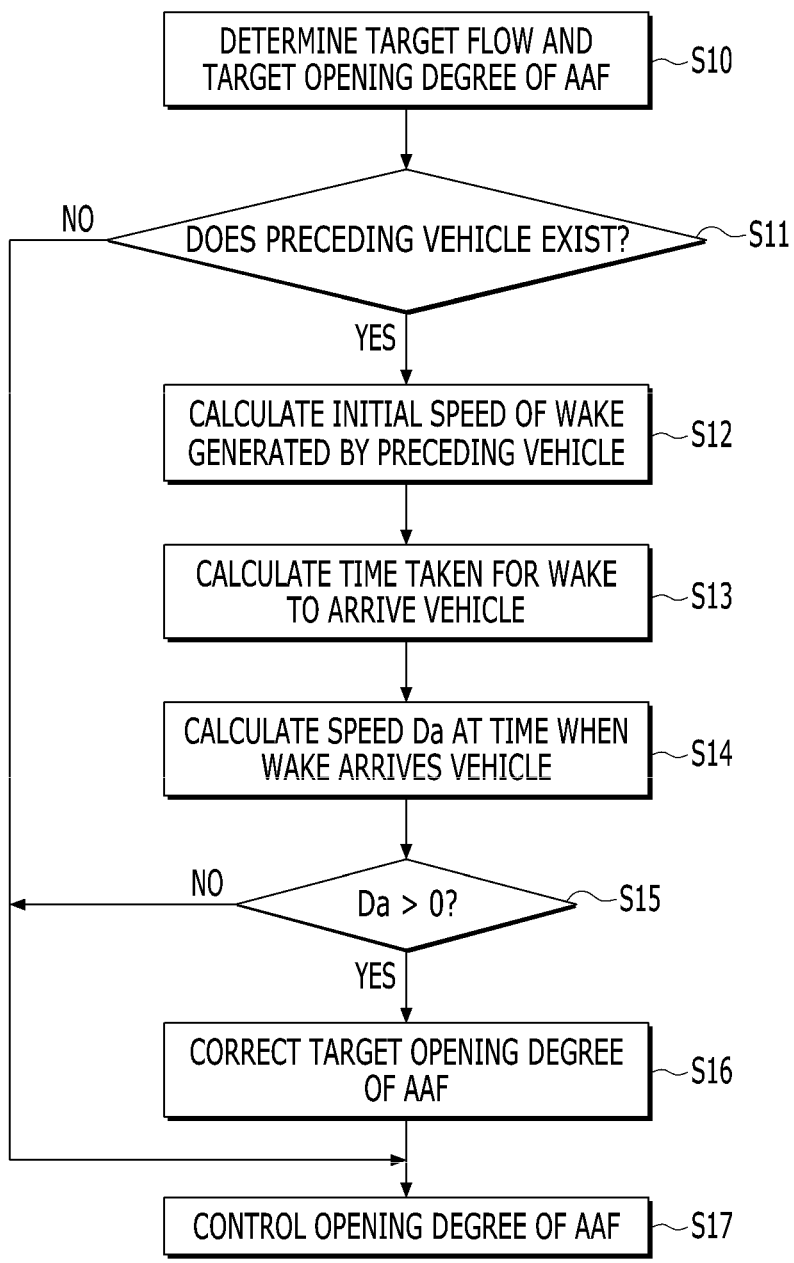

FIG. 5 schematically shows a method of controlling an AAF of a vehicle in some forms of the present disclosure.

DETAILED DESCRIPTION

Hereinafter, referring to the drawings, the exemplary forms disclosed in this specification will be described in detail, but the same or similar reference numerals are given to the same or similar constituent elements, and redundant descriptions thereof will be omitted.

The suffixes "module" and/or "–portion" for the constituent element used in the following description are given or mixed in consideration of only the ease of drafting the specification, and do not have meanings or functions distinguished from each other by themselves. In addition, in describing the exemplary form disclosed in this specification, when it is determined that a detailed description of a related known technology may obscure the gist of the exemplary form disclosed in this specification, the detailed description thereof will be omitted. In addition, the attached drawing is only for easy understanding of the exemplary form disclosed in this specification, the technical idea disclosed in this specification is not limited by the attached drawing, and it should be understood to include all modifications, equivalents and substitutes included in the spirit and scope of the present disclosure.

The terms including ordinal numbers such as first, second, etc. may be used to describe various constituent elements, but the constituent elements are not limited by the terms. The terms are used only for the purpose of distinguishing one constituent element from another constituent element.

When it is described that a certain constituent element is "connected to" or "coupled to" another constituent element, it may be directly connected or coupled to the other constituent element, but it should be understood that there is another constituent element therebetween. Meanwhile, when it is described that a constituent element is "directly connected to" or "directly coupled to" another constituent element, it should be understood that there is no other constituent element therebetween.

In the present application, the terms such as "comprise" or "have" are intended to designate the presence of a feature, number, step, operation, constituent element, part, or combinations thereof described in the specification, and it should be understood that the terms do not preclude in advance the possibility of the presence or addition of one or more other features or numbers, steps, operations, constituent elements, parts or combinations thereof.

In addition, the terms such as "-portion", "-group", "module", and "means" described in the specification mean a unit that processes at least one function or operation, which can be implemented as hardware or software or a combination of hardware and software.

Figure 1:
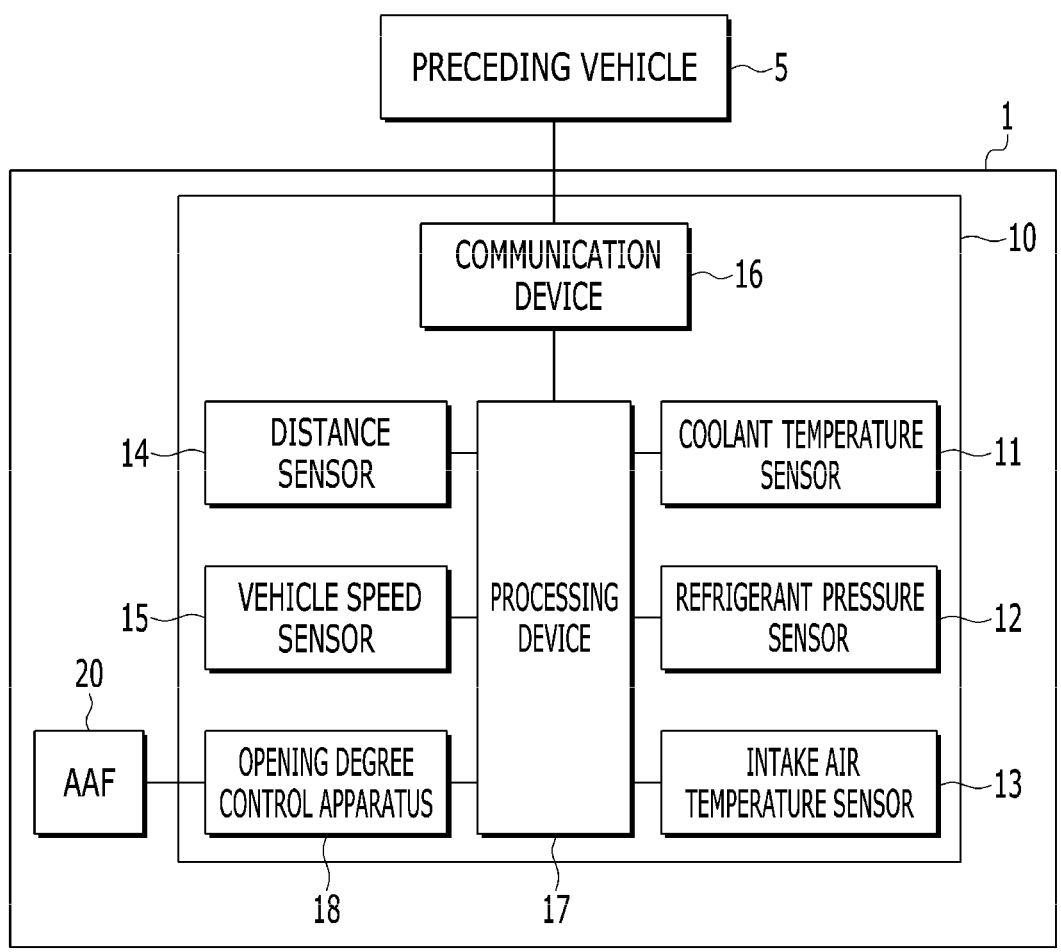

FIG. 1 schematically shows an apparatus for controlling an active air flap (AAF) of a vehicle in some forms of the present disclosure.

Referring to FIG. 1, an apparatus 10 for controlling the AAF may include a coolant temperature sensor 11, a refrigerant pressure sensor 12, an intake air temperature sensor 13, a distance sensor 14, a vehicle speed sensor 15, a communication device 16, a processing device 17, and an opening degree control apparatus 18.

The coolant temperature sensor 11 may detect a cooling water temperature of a coolant used for cooling an engine (not shown) of a vehicle 1. The coolant temperature sensor 11 may include, for example, a resistive sensor positioned in a coolant passage and measuring the temperature of the coolant.

The refrigerant pressure sensor 12 may detect a coolant/refrigerant pressure of a coolant/refrigerant flowing into an engine room of the vehicle 1. The refrigerant pressure sensor 12 may include, for example, a pressure sensor positioned in a high pressure line of the coolant/refrigerant flowing into the engine room and measuring the pressure of the coolant/refrigerant.

The intake air temperature sensor 13 may detect a temperature of air flowing into a combustion chamber of the engine of the vehicle 1. The intake air temperature sensor 13 may include, for example, a resistive sensor positioned on an intake manifold and measuring the temperature of air flowing into the combustion chamber of the engine.

The distance sensor 14 may detect a distance between the vehicle 1 and an object outside the vehicle 1. The distance sensor 14 may include, for example, a radar sensor positioned in front of the vehicle 1 and measuring an inter-vehicle distance between a preceding vehicle 5 and the vehicle 1.

The vehicle speed sensor 15 may detect a current speed of vehicle 1. The vehicle speed sensor 15 may include, for example, a rotation speed sensor mounted on a driving wheel (not shown) of the vehicle 1.

The communication device 16 may perform a vehicle-to-vehicle V2V communication function, that is, a wireless communication function with another vehicle positioned in a short distance with respect to the vehicle 1. The communication device 16 may communicate with another vehicle using at least one of, for example, 5th generation mobile telecommunication (5G), long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM) which are cellular communication protocols. The communication device 16 may communicate with another vehicle using at least one of, for example, wireless fidelity (WiFi), Bluetooth, or near field communication (NFC) which are short-range wireless communication.

The processing device 17 may process and control the overall operation of the apparatus 10 for controlling the AAF.

The processing device 17 may determine a target opening degree (opening amount) of an AAF 20 based on at least one of status information (vehicle speed information, cooling water temperature information, coolant/refrigerant pressure information, intake air temperature information, or vehicle engine load information) of the vehicle 1. For example, the processing device 17 may compare the cooling water temperature information measured through the coolant temperature sensor 11, the coolant/refrigerant pressure information measured through the refrigerant pressure sensor 12, and the intake air temperature information measured through the intake air temperature sensor 13 with threshold values set for respective parameters (a cooling water temperature, a coolant/refrigerant pressure, and an intake air temperature), and determine a target flow of the AAF 20 and the corresponding target opening degree based on a comparison result. In addition, various known technologies for determining the target opening degree of the AAF 20 may be used by the processing device 17 to determine the target opening degree of the AAF 20.

The processing device 17 may correct the target opening degree of the AAF 20 as described above based on the vehicle speed information of the vehicle 1, the inter-vehicle distance information between the vehicle 1 and the preceding vehicle 5, vehicle speed information of the preceding vehicle 5, an air resistance coefficient Cd, and overall height information. That is, the processing device 17 may calculate an initial speed of the wake generated by the preceding vehicle 5 and a speed change over time based on the vehicle speed information, the air resistance coefficient Cd, and the overall height information of the preceding vehicle 5, obtain a time taken for the wake generated by the preceding vehicle 5 to arrive the vehicle 1 and speed information of the wake upon arrival based on the vehicle speed information of the vehicle 1 and the inter-vehicle distance information between the vehicle 1 and the preceding vehicle 5, and correct the target opening degree of the AAF 20 based on the information.

Here, the inter-vehicle distance information between the vehicle 1 and the preceding vehicle 5 may be obtained through the aforementioned distance sensor 14. In addition, the vehicle speed information of the preceding vehicle 5 may be obtained based on the inter-vehicle distance measured through the distance sensor 14 and the vehicle speed information of the vehicle 1, or may be received from the preceding vehicle 5 through the communication device 16. In addition, at least one of the vehicle speed information, the air resistance coefficient Cd, and the overall height information of the preceding vehicle 5 may be received from the preceding vehicle 5 through the communication device 16. When the information (the air resistance coefficient Cd and the overall height) of the preceding vehicle 5 is not successfully received from the preceding vehicle 5, the processing device 17 may identify a vehicle model of the preceding vehicle 5 from an image of the preceding vehicle 5 captured through a camera (not shown), and use the air resistance coefficient Cd and overall height information of an industry average level in the identified vehicle model as the air resistance coefficient Cd and the overall height information of the preceding vehicle 5.

The influence of the wake generated by the preceding vehicle 5 on the vehicle 1 may be simplified and estimated as follows.

First, an air resistance F(N) of the preceding vehicle 5 may be calculated as in Equation 1 below.

$$F(N)=0.5\times\rho\times Cd\times Af\times Vx^2 \qquad \text{[Equation 1]}$$

Here, $\rho$ denotes an air density around the vehicle, Cd denotes an air resistance coefficient of the vehicle, Af denotes a front projection area of the vehicle, that is, a front area of the vehicle, and Vx denotes a relative speed of the vehicle with respect to air. Equation 1 above shows an air resistance when there is no wind, that is, when a wind speed is 0.

Equation 1 shown above may be expressed as Equation 2 below.

$$F(N)=Af\times(P1-P2) \qquad \text{[Equation 2]}$$

In Equation 2 above, P1 and P2 may be expressed as Equation 3 below by the Bernoulli equation.

$$P1 \approx \text{the atmospheric pressure} + 0.5\times\rho\times\int V1^2 dA/A$$

$$P2 \approx \text{the atmospheric pressure} + 0.5\times\rho\times\int V2^2 dA/A \qquad \text{[Equation 3]}$$

Here, V1 denotes a relative speed of air with respect to the vehicle in front of the vehicle, and V2 denotes a relative speed of air with respect to the vehicle at the rear of the vehicle.

Figure 2:
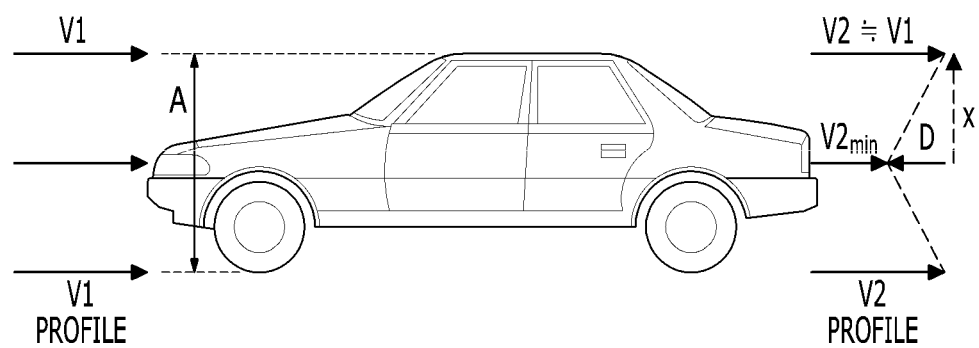

Meanwhile, in some forms of the present disclosure, in order to model an air flow around the vehicle with a more simplified model, it is assumed that the front area of the vehicle is Af=A×C (where A denotes an overall height of the vehicle, and C denotes an overall width of the vehicle), and a three-dimensional V2 profile complicatedly expressed according to a shape of the vehicle is simplified to a two-dimensional V2 profile as shown in FIG. 2.

Referring to FIG. 2, a minimum value V2 min of the relative speed V2 of the air passing through the vehicle is V2 min=V2−D (in this case, D denotes a maximum initial speed of the wake), and a speed D of the wake may gradually decrease toward a boundary of A and be 0 at the boundary of A. In FIG. 2, in order to simplify the V2 profile, a point at which V2 is minimum, that is, a point at which the initial speed D of the wake is maximum, is defined as a midpoint N2 of an overall height A of the vehicle. Referring to this, the V2 profile for an x direction may be simplified to Equation 4 below.

$$f(x)=(V2-D)-2D/A\times x \qquad \text{[Equation 4]}$$

In Equation 4 above, x denotes a vertical direction vector with respect to a point at which V2 is V2 min, that is, the midpoint N2 of the overall height A of the vehicle. Referring to FIG. 2 and Equation 4, Equation 2 shown above may be simplified as in Equation 5 below.

$$F(N)=0.5 \times \rho \times Cd \times A \times C \times Vx^2 = A \times C \times 0.5 \times \rho \times (\int V1^2 dA/A - \int V2^2 dA/A) = A \times C \times 0.5 \times \rho \times (V1^2 - 2 \times \int (f(x))^2 dx/A) \quad \text{[Equation 5]}$$

In Equation 5 above, $\int V2^2 dA/A$ may be expressed as $2 \times \int (f(x))^2 \, dx/A$ by calculating an integral period as $[0, A/2]$.

Also, in Equation 5 above, $\int (f(x))^2 \, dx$ may be developed as in Equation 6 below.

$$\int (f(x))^2 dx = \int ((V2-D)-2D/A \times x)^2 dx = \int (E-F \times x)^2 dx$$

$$= \int (E^2 - 2 \times E \times F \times x + F^2 \times x^2) dx$$

$$= 1/3 \times F^2 \times x^3 - E \times F \times x^2 + E^2 \times x + \text{constant}$$

$$= 1/3 \times F^2 \times A/2^3 - E \times F \times A/2^2 + E^2 \times A/2 \text{ (integrating by applying the integration period}[0,A/2]\text{to } x) \quad \text{[Equation 6]}$$

Therefore, in Equation 5 above, $2 \times \int (f(x))^2 \, dx/A$ may be expressed as in Equation 7 below.

$$2 \times \int f(x)^2 dx/A = \int (f(x))^2 dx \times 2/A$$

$$= 1/3 \times F^2 \times A/2^2 - E \times F \times A/2 + E^2$$

$$= D^2/3 + 2 \times D \times V2 - 2 \times D^2 + D^2 - 2 \times D \times V2 + (V2)^2$$

$$= -2/3 \times D^2 + (V2)^2 \quad \text{[Equation 7]}$$

In the V2 profile of FIG. 2, because when there is no wind, a vehicle speed Vx is V1 and V2=V1 at the boundary of A, based on this, Equation 5 above may be simplified to Equation 8 below by applying Equation 7 to Equation 5.

$$Cd \times (Vx)^2 = 2/3 \times D^2 \quad \text{[Equation 8]}$$

In addition, Equation 9 below may be derived from Equation 8 above.

$$D = (3/2 \times Cd \times (Vx)^2)^{1/2} \quad \text{[Equation 9]}$$

Referring to Equation 9 above, the initial maximum speed D of the wake may be simplified to an equation of the air resistance coefficient Cd and the vehicle speed Vx of the vehicle.

Figure 3:
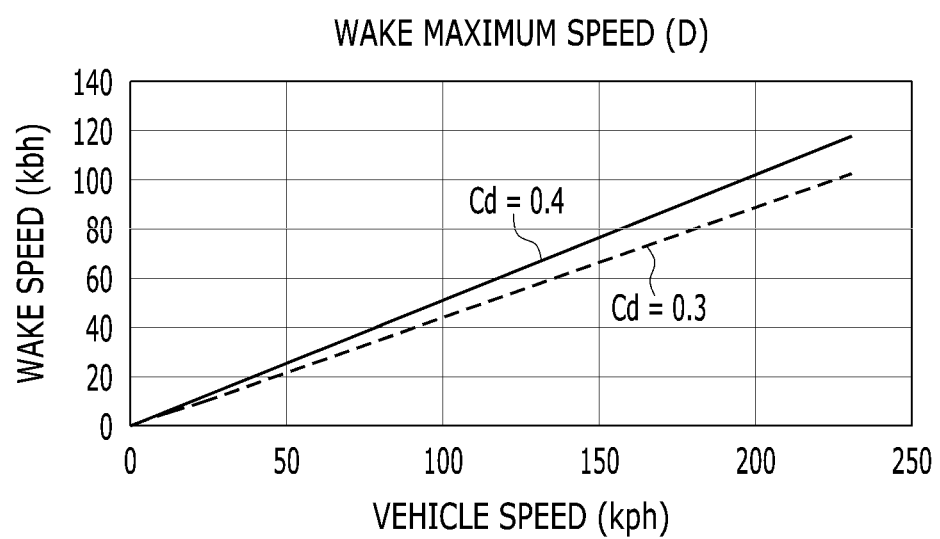
FIG. 3 shows an example of a relationship between an initial speed of a wake, a vehicle speed, and an air resistance coefficient calculated by an apparatus for controlling an AAF of a vehicle in some forms of the present disclosure.

FIG. 3 shows an example of a relationship between the initial maximum speed D of a wake, a vehicle speed, and the air resistance coefficient Cd based on Equation 9 above. Referring to FIG. 3, the initial maximum speed D of the wake may have a larger value as the vehicle speed increases and the air resistance coefficient Cd increases.

V2min, which is the minimum speed of V2, =V1−D is a relative air flow rate with respect to a vehicle, and if there is no air resistance, D=0, and thus it may be seen that there is no difference in an air flow rate between the front and rear of the vehicle. Therefore, D may be regarded as a maximum value in the initial speed of the air flow (the wake) that is instantaneously generated in a direction in which the vehicle travels at a time the vehicle passes in the stationary air when viewed from a rear point of any vehicle other than the vehicle. When only the air flow is considered not the relative speed with respect to the vehicle, an initial absolute speed of the air flow at the rear of the vehicle may be expressed as "(+)D" with respect to the traveling direction of the vehicle. However, when the air flow rate affects a following vehicle, because a traveling air decreases by "D" compared to a vehicle speed of the following vehicle with respect to the following vehicle, the initial absolute speed may be regarded as "(−)D".

Meanwhile, the wake generated at the initial speed of "D" may be dissipated by a shear friction due to viscosity and converge to speed 0, that is, a stagnant air state at the boundary of A. It may be expressed in a Newtonian fluid that a frictional force Ff=viscosity coefficient/area×speed difference/length. Referring to FIG. 2, the wake may be simplified to a shear flow in which a speed difference is D (the initial speed D and a final speed 0), and a length is A/2 (in FIG. 2, at a point where the wake has an initial maximum speed (that is, at a point of V2 min), a travel distance to the boundary of A where the flow rate of air is 0 because the original air is stagnant without the influence of the vehicle). In addition, because the frictional force Ff=ma and the mass m of air=area×air density, an initial deceleration of the wake (the deceleration at a time when the wake D is generated) may be approximately obtained as shown in Equation 10 below from the frictional force formula of the Newtonian fluid described above.

$$\text{deceleration } a = \text{viscosity coefficient}/\text{air density} \times D \times 2/A \quad \text{[Equation 10]}$$

In Equation 10 above, because viscosity coefficient/air density=kinematic viscosity coefficient, D denotes the initial air flow rate at the time the wake is generated, that is, the initial speed V of the wake, and deceleration a=−dV/dt, Equation 10 is a=−dV/dt=2×kinematic viscosity coefficient/A×V. If this is simplified to a simple differential equation having the initial speed D, V denotes a function of a time t, and if t=0, V=D, the wake speed with respect to the time t may be expressed by Equation 11 below.

$$V(t) = D + 1 - e^{(\text{kinematic viscosity coefficient}/A/dL \times t)} \quad \text{[Equation 11]}$$

In Equation 11, here, dL may be physically regarded as a concept similar to a turbulent mixing distance of Prandtl, and an attenuation of speed over time may be predicted using an approximate experimental value. Therefore, a speed change over the time t of the wake may be simplified as a function determined by the initial speed D of the wake and the overall height A of the vehicle.

Figure 4:
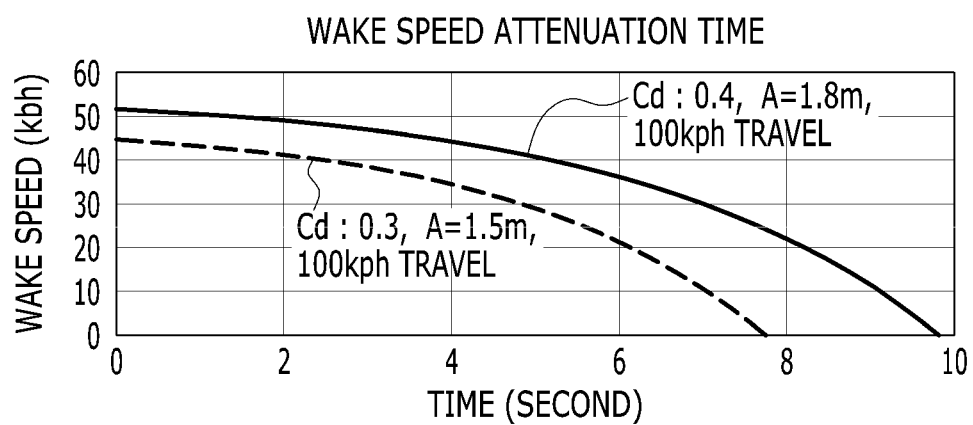
FIG. 4 shows an example of a relationship between a speed change of a wake over time and an overall height, a vehicle speed, and an air resistance coefficient of a vehicle calculated by an apparatus for controlling an AAF of a vehicle in some forms of the present disclosure.

FIG. 4 shows an example of a relationship between a speed change of a wake over time and the overall height A, the vehicle speed Vx, and the air resistance coefficient Cd of a vehicle, based on Equation 11. Referring to FIG. 4, the initial speed D of the wake has a larger value as the air resistance coefficient Cd increases and the overall height A of the vehicle increases, and thus, a time the wake is maintained may be also longer as the air resistance coefficient Cd increases and the overall height A of the vehicle increases.

Meanwhile, if a distance between the vehicle 1 and the preceding vehicle 5 is L and the speed of the vehicle 1 is Vr, a time t taken for the vehicle 1 to arrive the wake of the preceding vehicle 5, that is, a time taken for the wake to arrive the following vehicle 1 may be expressed as L/Vr. In addition, when the time t taken for the wake to arrive the vehicle 1 is calculated as described above, a wake speed Da at a time when the wake arrives the vehicle 1 may be calculated by substituting the time t into Equation 11 above.

As described above, when the wake speed Da at the time when the wake generated by the preceding vehicle 5 arrives the vehicle 1 is calculated, the processing device 17 may correct a target opening degree of the AAF 20 based on the wake speed Da.

First, the processing device 17 may calculate an air volume Va' of the AAF 20 (an air flow flowing in through an opening of the AAF 20) when controlling the AAF 20 at the initially calculated target opening degree Aa as in Equation 13 below, based on the initially calculated target opening degree Aa of the AAF 20, the current vehicle speed V of the vehicle 1, and the speed Da of the wake at the time when the wake of the preceding vehicle 5 arrives the vehicle 1.

$$Va'=(V-Da)\times Cf(Aa) \quad \text{[Equation 12]}$$

In Equation 1 above, Cf denotes an air volume coefficient, and Cf(Aa) denotes a flow (or a volume) of air simultaneously passing through the opening of the AAF 20, and its value may vary depending on an opening degree Aa of the AAF 20. Also, in Equation 1 above, V-Da denotes an inflow speed of air changed by the influence of the wake. Referring to Equation 12 above, when the AAF 20 is controlled at the initially calculated target opening degree Aa, the air volume Va' of the AAF 20 may be reduced compared to the original target air volume Va. Accordingly, in order to correct the air volume Va' and obtain a desired target air volume Va=V× Cf(Aa), Cf(Aa') corresponding to a corrected opening degree (Aa') may be obtained as in Equation 13 below.

$$V\times Cf(Aa)=(V-Da)\times Cf(Aa')$$

$$Cf(Aa')=(V/(V-Da))\times Cf(Aa) \quad \text{[Equation 13]}$$

When Cf(Aa') is determined through Equation 13 above, the processing device 17 may obtain opening degree information of the AAF 20 corresponding to Cf(Aa') from a predetermined Cf map, and set the opening degree information as the final target opening degree of the AAF 20.

In some forms of the present disclosure, the air flow CF(Aa) that simultaneously passes through the opening of the AAF 20 through an experiment in a pre-test stage of the vehicle 1 may be obtained for each opening degree of the AAF 20, or an air flow that simultaneously passes through the opening of the AAF 20 through simulation may be obtained for each opening degree of the AAF 20, and values obtained as described above may be prepared in form of a table to generate the Cf map. A Cf(Aa) value according to the opening degree Aa of the AAF 20 in Equation 12 above may be obtained from the Cf map generated as above, or the opening degree Aa' corresponding to Cf(Aa') calculated through Equation 13 above may also be obtained.

When the final target opening degree Aa' is determined through the above-described process, the processing device 17 may control the opening degree control apparatus 18 to control the opening degree of the AAF 20 based on the final target opening degree Aa'. That is, the opening degree control apparatus 18 may receive information about the final target opening degree Aa' or a control signal corresponding thereto from the processing device 17 and control the AAF 20 so that the opening degree of the AAF 20 is the final target opening degree Aa'.

FIG. 5 schematically shows a method of controlling an AAF of a vehicle in some forms of the present disclosure. The method of controlling the AAF of FIG. 5 may be performed by the apparatus 10 for controlling the AAF described with reference to FIG. 1 above.

Referring to FIG. 5, the apparatus 10 for controlling the AAF may determine a target flow of the AAF 20 and the corresponding target opening degree (opening amount) based on at least one of status information (vehicle speed information, cooling water temperature information, coolant/refrigerant pressure information, intake air temperature information, or vehicle engine load information) of the vehicle 1 (S10). For example, the apparatus 10 for controlling the AAF may compare the cooling water temperature information measured through the coolant temperature sensor 11, the coolant/refrigerant pressure information measured through the refrigerant pressure sensor 12, and the intake air temperature information measured through the intake air temperature sensor 13 with threshold values set for respective parameters (a cooling water temperature, a coolant/refrigerant pressure, and an intake air temperature), and determine the target flow of the AAF 20 and the corresponding target opening degree based on a comparison result.

Thereafter, the apparatus 10 for controlling the AAF may identify whether a preceding vehicle traveling within a predetermined distance exists (S11) and calculate the initial speed D of a wake generated by the preceding vehicle when the preceding vehicle exists (S12).

In step S11 above, the apparatus 10 for controlling the AAF may identify the presence of the preceding vehicle through the distance sensor 14, or a camera (not shown).

In step S12 above, the apparatus 10 for controlling the AAF may calculate the initial speed D of the wake generated by the preceding vehicle 5 based on vehicle speed information, the air resistance coefficient Cd, and the overall height information A of the preceding vehicle 5 (see Equation 9 above). Here, the apparatus 10 for controlling the AAF may receive at least one of the vehicle speed information, the air resistance coefficient Cd, or the overall height information of the preceding vehicle 5 from the preceding vehicle 5. When the information (the air resistance coefficient Cd and the overall height) of the preceding vehicle 5 is not successfully received from the preceding vehicle 5, the processing device 17 may identify a vehicle model of the preceding vehicle 5 from an image of the preceding vehicle 5 captured through a camera (not shown), and use the air resistance coefficient Cd and overall height information of an industry average level in the identified vehicle model as the air resistance coefficient Cd and the overall height information A of the preceding vehicle 5.

When the initial speed D of the wake generated by the preceding vehicle 5 is calculated through step S12 above, the apparatus 10 for controlling the AAF may calculate a time (t=L/Vr) taken for the wake generated by the preceding vehicle 5 to arrive the vehicle 1 based on the inter-vehicle distance L with the preceding vehicle 5 and the current vehicle speed Vr of the vehicle 1 (S13). Also, based on the time t taken for the wake to reach the vehicle 1, the apparatus 10 for controlling the AAF may calculate the speed Da at a time when the wake arrives the vehicle 1 (S14).

In step S14 above, the apparatus 10 for controlling the AAF may calculate a speed of the wake at the time when the wake generated by the preceding vehicle 5 to arrive the vehicle 1, based on the initial speed D of the wake, the overall height A of the preceding vehicle 5, and the time t taken for the wake to reach the vehicle 1 calculated in step S12 (see Equation 11).

The apparatus 10 for controlling the AAF which obtains the speed Da at the time when the wake arrives the vehicle 1 in step S14 above confirms whether the corresponding speed Da is greater than 0 (S15). That is, the apparatus 10 for controlling the AAF confirms whether the wake is dissipated before arriving the vehicle 1.

In step S15, if it is confirmed that the wake will arrive the vehicle 1 at a predetermined speed (Da>0), the apparatus 10 for controlling the AAF may correct the target opening degree of the AAF 20 based on the speed Da of the wake upon arrival of the vehicle 1 calculated in step S14 (S16).

When influenced by the wake generated by the preceding vehicle 5, if the opening degree of the AAF 20 is controlled at the target opening degree Aa calculated initially in step S10, an air volume of the AAF 20 may be reduced compared to the original target air volume. Therefore, in step S16, in order to compensate for the air volume of the AAF 20 that is reduced due to the influence of the wake, the apparatus 10 for controlling the AAF may correct the target opening degree of the AAF 20 to increase as the speed Da of the wake upon arrival of the vehicle 1 increases.

When the final target opening degree of the AAF 20 is determined through steps S10 to S16 described above, the apparatus 10 for controlling the AAF may actively control the opening degree of the AAF 20, that is, the opening amount (S17).

As described above, when the vehicle 1 enters a wake period generated by the preceding vehicle 5, an air volume of a cooling wind flowing into the AAF 20 is reduced compared to the target flow due to the influence of the wake, and as a result, the cooling performance deteriorates by the cooling wind, which causes a problem that additional cooling power input occurs. In some forms of the present disclosure, in order to solve this problem, the influence of the wake on the air inflow amount of the AAF 20 is calculated, and the opening degree of the AAF 20 is adjusted to compensate for the air inflow amount reduced by the wake, and thus the additional cooling power input is prevented, thereby improving the fuel efficiency of the vehicle 1.

Referring to FIG. 4 as an example, the wake generated by the preceding vehicle 5 having the air resistance coefficient Cd of 0.3 and the overall height A of 1.5 m, and traveling at a speed of 100 kph may have an initial speed of approximately 44 kph (see Equation 9). In addition, when the following vehicle 1 traveling at the speed of 100 kph is following the preceding vehicle 5 at an interval of 180 m, it takes about 6.5 seconds for the following vehicle 1 to arrive the wake generated by the preceding vehicle 5. The wake generated by the preceding vehicle 5 at an initial speed of approximately 44 kph may be reduced to approximately a level of 17 kph after 6.5 seconds taken to arrive the following vehicle 1 (see Equation 11). Therefore, for the same AAF opening degree, a cooling air volume flowing in through the AAF 20 may be reduced by approximately 17% (a flow rate of air flowing into the AAF 20 is 100 kph-17 kph=83 kph) compared to the case where there is no wake due to the influence of the wake described above (see Equation 12). Although there may be a difference according to a coolant flow in a general vehicle radiator, when the cooling air volume is reduced by 17%, an amount of heat dissipation is reduced by approximately 7~10%. To compensate for this, a method of increasing the coolant flow may be used, and additional power for increasing the coolant flow may be used. In some forms of the present disclosure, it is possible to reduce the input of additional cooling power by compensating for the cooling air volume reduced by the wake through the opening degree control of the AAF 20, thereby improving the fuel efficiency of the vehicle.

The method of controlling the AAF of the vehicle in some forms of the present disclosure may be executed through software. When the method is performed through software, constituent elements of the present disclosure are code segments that execute a necessary job. A program or the code segments may be stored in a processor readable medium or may be transmitted by a transmission medium or a computer data signal coupled to a carrier wave in a communication network.

The computer readable recording medium is any data storage device that can store data which can be read by a computer system. Examples of the computer readable recording medium include read-only memory (ROM), random-access memory (RAM), CD-ROMs, DVD_ROMs, DVD_RAMs, magnetic tapes, floppy disks, hard disks, optical data storage devices, etc. The computer readable recording medium can also be distributed over network coupled computer devices so that the computer readable code is stored and executed in a distributed fashion.

The referred drawings and the described detailed description of the disclosure above are merely examples of the present disclosure, and are merely used to describe the present disclosure and are not used to limit the meaning or the scope of the present disclosure described in the claims. Therefore, one of ordinary skill in the art can be easily select and replace therefrom. Also, one of ordinary skill in the art can omit some of the constituent elements described in the present specification without deterioration of performance or can add constituent elements for improving the performance. Furthermore, one of ordinary skill in the art can change a sequence of steps of the method described in the present specification according to a process environment or equipment. Accordingly, the scope of the present disclosure should be determined by the claims and its equivalents, not by the described forms of the present disclosure.

DESCRIPTION OF SYMBOLS

1: vehicle
5: preceding vehicle
10: AAF control apparatus
11: coolant temperature sensor
12: refrigerant pressure sensor
13: intake air temperature sensor
14: distance sensor
15: vehicle speed sensor
16: communication device
17: processing device
18: opening degree control apparatus
20: AAF

What is claimed is:

1. An apparatus for controlling an active air flap (AAF) of a vehicle, the apparatus comprising:
   a plurality of sensors configured to detect status information of the vehicle;
   an opening degree controller configured to control an opening degree of the AAF; and
   a processor configured to:
   determine a target flow and a target opening degree of the AAF based on the status information;
   calculate an initial speed of a wake generated by a preceding vehicle of the vehicle based on vehicle information of the preceding vehicle;
   obtain a speed of the wake at a time when the wake arrives the vehicle based on a speed of the vehicle, an inter-vehicle distance between the vehicle and the preceding vehicle, and the initial speed of the wake;
   correct the target opening degree based on the speed of the wake at the time when the wake arrives the vehicle; and
   control the opening degree control apparatus to adjust the opening degree of the AAF corresponding to the corrected target opening degree.

2. The apparatus of claim 1, wherein the processor is further configured to:
   calculate the initial speed of the wake based on a vehicle speed, an overall height, and an air resistance coefficient of the preceding vehicle.

3. The apparatus of claim 2, further comprising:
   a communication device, wherein the processor is further configured to receive the vehicle speed, the overall height, and the air resistance coefficient of the preceding vehicle through the communication device.

4. The apparatus of claim 2, wherein the processor is further configured to:
identify a vehicle model of the preceding vehicle from an image of the preceding vehicle captured through a camera; and
use an air resistance coefficient and an overall height of an industry average level corresponding to the vehicle model of the preceding vehicle as the air resistance coefficient and the overall height of the preceding vehicle.

5. The apparatus of claim 2, wherein:
the plurality of sensors includes a distance sensor, and
the processor is further configured to obtain the vehicle speed of the preceding vehicle based on an inter-vehicle distance between the vehicle and the preceding vehicle measured through the distance sensor and a vehicle speed of the vehicle.

6. The apparatus of claim 1, wherein the processor is further configured to:
increase the target opening degree to compensate for a reduction in the flow of the AAF due to the speed of the wake at the time when the wake arrives the vehicle.

7. The apparatus of claim 6, wherein the processor is further configured to:
increase the target opening degree as the speed of the wake at the time when the wake arrives the vehicle increases.

8. The apparatus of claim 1, wherein:
the status information includes a cooling water temperature, a coolant/refrigerant pressure, and an intake air temperature of air flowing into an engine combustion chamber of the vehicle, and
the processor is further configured to determine the target flow and the target opening degree based on the cooling water temperature, the coolant/refrigerant pressure, and the intake air temperature.

9. A method of controlling an active air flap (AAF) of a vehicle, the method comprising:
detecting, by a plurality of sensors, status information of the vehicle;
determining, by a processor, a target flow and a target opening degree of the AAF based on the status information;
when a preceding vehicle is detected, calculating, by the processor, an initial speed of a wake generated by the preceding vehicle based on vehicle information of the preceding vehicle;
obtaining, by the processor, a speed of the wake at a time when the wake arrives the vehicle based on a speed of the vehicle, an inter-vehicle distance between the vehicle and the preceding vehicle, and the initial speed of the wake;
correcting, by the processor, the target opening degree based on the speed of the wake at the time when the wake arrives the vehicle; and
adjusting, by the processor, the opening degree of the AAF corresponding to the corrected target opening degree.

10. The method of claim 9, wherein the calculating of the initial speed of the wake includes:
calculating the initial speed of the wake based on a vehicle speed, an overall height, and an air resistance coefficient of the preceding vehicle.

11. The method of claim 10, further comprising:
receiving the vehicle speed, the overall height, and the air resistance coefficient of the preceding vehicle from the preceding vehicle.

12. The method of claim 10, further comprising:
identifying a vehicle model of the preceding vehicle from an image of the preceding vehicle captured through a camera; and
obtaining an air resistance coefficient and an overall height of an industry average level corresponding to the vehicle model of the preceding vehicle as the air resistance coefficient and the overall height of the preceding vehicle.

13. The method of claim 10, further comprising:
obtaining the vehicle speed of the preceding vehicle based on an inter-vehicle distance between the vehicle and the preceding vehicle and a vehicle speed of the vehicle.

14. The method of claim 9, wherein the correcting of the target opening degree includes:
increasing the target opening degree to compensate for a reduction in the flow of the AAF due to the speed of the wake at the time when the wake arrives the vehicle.

15. The method of claim 14, wherein the increasing of the target opening degree includes:
increasing the target opening degree as the speed of the wake at the time when the wake arrives the vehicle increases.

16. The method of claim 14, wherein:
the status information includes a cooling water temperature, a coolant/refrigerant pressure, and an intake air temperature of air flowing into an engine combustion chamber of the vehicle, and
the determining of the target flow and the target opening degree includes determining the target flow and the target opening degree based on the cooling water temperature, the coolant/refrigerant pressure, and the intake air temperature.

* * * * *